(12) United States Patent
Yang et al.

(10) Patent No.: US 9,773,241 B2
(45) Date of Patent: Sep. 26, 2017

(54) DYNAMIC BOOST OF NEAR FIELD COMMUNICATIONS (NFC) PERFORMANCE/COVERAGE IN DEVICES

(71) Applicant: Intel Corporation, Santa Clara, CA (US)

(72) Inventors: Songnan Yang, San Jose, CA (US); Farid Adrangi, Lake Oswego, OR (US); Ulun Karacaoglu, San Diego, CA (US); Anand Konanur, Sunnyvale, CA (US); Denny Iriawan, San Jose, CA (US); Thomas J Stepek, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 13/795,981

(22) Filed: Mar. 12, 2013

(65) Prior Publication Data
US 2014/0129425 A1    May 8, 2014

Related U.S. Application Data

(60) Provisional application No. 61/723,136, filed on Nov. 6, 2012.

(51) Int. Cl.
*G06Q 20/32* (2012.01)
*G06K 7/10* (2006.01)
*H03G 3/30* (2006.01)

(52) U.S. Cl.
CPC ..... *G06Q 20/3278* (2013.01); *G06K 7/10158* (2013.01); *G06K 7/10237* (2013.01); *H03G 3/3042* (2013.01)

(58) Field of Classification Search
CPC ...................................................... G06Q 40/00
(Continued)

(56) References Cited

U.S. PATENT DOCUMENTS 8,225,997 B1 * 7/2012 Bierbaum .......... G06Q 20/0453
235/375
8,905,317 B1 * 12/2014 Hsu .................... G06K 7/10356
235/487

(Continued)

FOREIGN PATENT DOCUMENTS

CN    1247630 A    3/2000
CN    101299619 A    11/2008

(Continued)

OTHER PUBLICATIONS

International Search Report and Written Opinion received for PCT Patent Application No. PCT/US2013/048044, mailed on Oct. 16, 2013, 10 pages.

(Continued)

*Primary Examiner* — Kirsten Apple
(74) *Attorney, Agent, or Firm* — Schiff Hardin LLP

(57) ABSTRACT

Described herein are architectures, platforms and methods for dynamic amplification/boosting of near field communications (NFC) antenna transmission power in a device during NFC related functions that require increase in an NFC antenna transmission power such as a payment transaction. For example, to comply with Europay MasterCard and Visa (EMVco) standards with regard to higher NFC antenna transmission power during the EMVco transactions, the NFC antenna transmission power may be dynamically controlled to maximize efficiency of a battery/power supply of the device.

8 Claims, 6 Drawing Sheets

(58) Field of Classification Search
USPC .......................................................... 705/35
See application file for complete search history.

(56) References Cited

U.S. PATENT DOCUMENTS

| | | | |
|---|---|---|---|
| 2008/0136595 A1* | 6/2008 | Finkenzeller | G06K 7/0008 |
| | | | 340/10.1 |
| 2008/0238625 A1* | 10/2008 | Rofougaran | H04B 5/0012 |
| | | | 340/10.1 |
| 2008/0296978 A1 | 12/2008 | Finkenzeller et al. | |
| 2010/0112940 A1 | 5/2010 | Yoon | |
| 2010/0190436 A1* | 7/2010 | Cook | H04B 5/00 |
| | | | 455/41.1 |
| 2010/0222021 A1* | 9/2010 | Balsan | G06Q 20/18 |
| | | | 455/406 |
| 2010/0271177 A1* | 10/2010 | Pang | G06K 7/10019 |
| | | | 340/10.1 |
| 2010/0271196 A1* | 10/2010 | Schmitt | G08G 1/052 |
| | | | 340/466 |
| 2010/0279606 A1* | 11/2010 | Hillan | H04B 5/00 |
| | | | 455/41.1 |
| 2011/0019824 A1* | 1/2011 | Sattiraju et al. | 380/270 |
| 2011/0037575 A1 | 2/2011 | Horst et al. | |
| 2011/0065383 A1 | 3/2011 | Frankland et al. | |
| 2012/0075148 A1 | 3/2012 | Cho | |
| 2012/0149301 A1 | 6/2012 | Wiley | |
| 2012/0270499 A1 | 10/2012 | Wilson | |
| 2014/0086301 A1* | 3/2014 | Akhavan | H04L 25/03828 |
| | | | 375/238 |

FOREIGN PATENT DOCUMENTS

| | | |
|---|---|---|
| CN | 101325425 A | 12/2008 |
| CN | 101499118 A | 8/2009 |
| CN | 102132501 A | 7/2011 |
| CN | 102157040 A | 8/2011 |
| CN | 102237902 A | 11/2011 |
| CN | 102318216 A | 1/2012 |
| CN | 102404025 A | 4/2012 |
| CN | 202422143 U | 9/2012 |
| CN | 105303228 A | 2/2016 |
| CN | 101471702 A | 7/2016 |
| EP | 2330753 A1 | 6/2011 |
| WO | 2010/143849 A3 | 3/2011 |
| WO | 2014/074177 A1 | 5/2014 |

OTHER PUBLICATIONS

International Preliminary Report on Patentability and Written Opinion Received for PCT Patent Application No. PCT/US2013/048044, mailed on May 21, 2015, 7 pages.
Office Action received for Chinese Patent Application No. 201380052293.1, mailed on Feb. 14, 2017, 8 Pages of Office Action only.
Office Action received for Chinese Patent Application No. 201380052293.1, mailed on Sep. 5, 2016, 7 Pages of Office Action only.
Extended European Search report received for European Patent Application No. 13854147.9, mailed on Jul. 5, 2016, 7 pages.
Office Action received for Chinese Patent Application No. 201380052293.1, mailed on May 18, 2016, 7 Pages of Office Action.
Office Action received for Chinese Patent Application No. 201380052293.1, mailed on Jan. 7, 2016, 5 pages of Chinese Office Action and Search Report only.

* cited by examiner

DYNAMIC BOOST OF NEAR FIELD COMMUNICATIONS (NFC) PERFORMANCE/COVERAGE IN DEVICES

RELATED APPLICATION

This application claims the benefit of priority of U.S. Provisional Patent Application Ser. No. 61/723,136 filed Nov. 6, 2012.

BACKGROUND

Near field communication (NFC) is an emerging radio frequency identifier (RFID) based technology that promises to enable wireless transfer of data over very short distances and replace regular contact based interactions with a contactless interaction between two devices or a device and a card placed in close proximity. Typical usages include coupons, identifier (ID) cards, mobile payments, and peer to peer connections between devices.

Various applications may be enabled by NFC technology including many that compute continuum and mobile payment. For example, the Windows™ 8 Operating System offers support for proximity usages, where users with NFC devices may "tap and share" and/or "tap and pair" by bringing NFC enabled devices in proximity with one another. Another emerging application along with security services is "tap and pay," where mobile platforms (e.g., Ultrabooks, tablets and smartphones) may be used as a personal point of sale (POS) terminal to read NFC enabled credit cards/smartphones for payment applications.

The payment and proximity usages of the NFC have dramatically different reader performance requirements on the integrated NFC device. For example, EMVco (Europay, MasterCard and Visa) which governs payment terminals, may require more RF power (approximately 5 to 6 times than normal operational power) from the integrated reader to support NFC communication with NFC enabled credit cards. In contrast, proximity usage which is certified by the NFC Forum does not require the reader to emit a very strong RF field, such that a less complicated NFC solution may be used.

Currently, there are multiple low cost, small size and relatively simple to integrate NFC solutions that may support proximity usage. A challenge that designers face in the existing NFC solutions is to meet, for example, the performance and user experience requirements of the EMVco with minimum added cost, limiting size increases, and minimal additional power consumption.

NFC systems may rely on the near field coupling of a magnetic field between two coils tuned near resonance.

As shown by the following equation:

$$Pr \propto Pt \cdot Q \cdot k$$

The power received by the NFC card being read (Pr) is determined by the transmit power (Pt), quality factor of the two coils (Q), and the coupling coefficient between them (k). The quality factor (Q) is more or less fixed per the NFC radio design, while the coupling coefficient is mainly determined by how much magnetic flux generated by the transmit (Tx) coil is able to penetrate the receive (Rx) coil and induce electrical current. Therefore there is a dependency on the size of the coils and ferrite material quality.

Conventionally, a larger coil with larger and high quality ferrite can be used to increase the coupling factor (k) which in turn increases the power received by the NFC card. However, as mobile devices get smaller and more compact, it becomes more challenging to allocate a relatively large space for antennas. Furthermore, device manufacturers may face the need for larger and more expensive ferrite material. Increasing the transmit power (Pt) may require new NFC chip designs and may significantly increase system power consumption.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Figure 1:
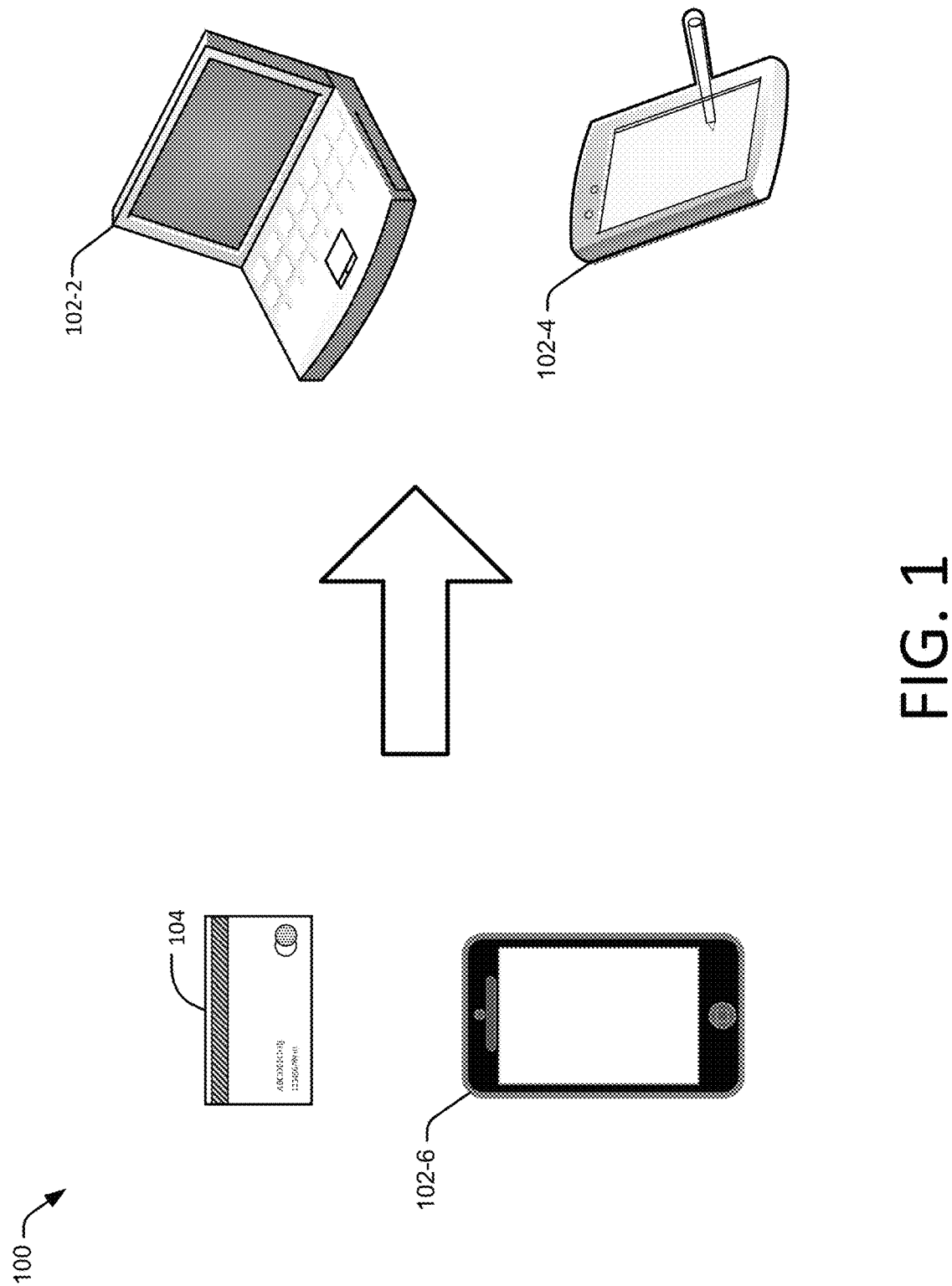
FIG. 1 is an example scenario illustrating near field communications (NFC) arrangement of portable devices to implement dynamic adjustment of transmission power during NFC related functions or transactions.

Described herein are architectures, platforms and methods for dynamic amplification/boosting of near field communications (NFC) antenna transmission power in a device during NFC related functions that require increase in an NFC antenna transmission power such as a payment transaction. For example, to comply with EMVco standards with regard to higher NFC antenna transmission power during the payment transaction, the NFC antenna transmission power may be dynamically controlled to maximize efficiency of a battery/power supply of the device.

As an example of a present implementation herein, a power amplifier (PA) (or alternately called a booster) is positioned between an NFC module and an NFC antenna. In this example, the CPU (central processing unit) or SOC (System on chip) is configured to control and enable increase of an amplifier gain of the PA during the payment transaction, or in any other NFC related functions that require higher transmission power. In other words, the amplifier gain is maintained at a regular NFC antenna transmission power as a default mode; however, during NFC related functions that require boosted transmission power, the amplifier gain of the PA is increased to facilitate transmission of higher NFC antenna transmission power. The increasing of the amplifier gain may be configured to be of limited duration or upon completion of the NFC related functions that require boosted transmission power.

In an implementation, the PA may similarly be positioned in between an NFC module—as the control unit—and the NFC antenna. In this implementation, the NFC module is configured to implement the same functions of the CPU/SOC as discussed above. For example, the NFC module is configured to control the PA to facilitate generation of the regular NFC antenna transmission power as the default mode; however, during the NFC related functions that require increased transmission power, the NFC module may control the PA to increase its amplifier gain.

As an example of present implementation herein, the CPU/SOC or the NFC module may be configured to directly supply a boosted amount of input current or input voltage during the NFC related functions that require boosted transmission power (e.g., payment transactions) to generate the increased NFC antenna transmission power. In this example, the PA is omitted in its circuitry.

In another example, a fix amplifier gain PA is coupled with the CPU/SOC or the NFC module; however, a controller switch may be positioned to connect or disconnect the CPU/SOC or the NFC module from the fix amplifier gain PA. In this example, the controller switch allows utilization of the fix amplifier gain PA during the NFC related functions that require boosted transmission power; however, during the proximity usage, the controller switch bypasses the fix amplifier gain PA and connects the NFC module or the CPU/SOC directly to the NFC antenna.

In the examples described above, the PA may be external or integrated on the same module with the NFC module. For example, the external PA is an amplifier in a radio component of the device. In this example, the radio component is utilized for regular wireless communications such as through wireless fidelity (Wi-Fi) signals, cellular signals, and the like. In another example, the internal PA may be provided/integrated within the NFC module for purposes of boosting NFC antenna transmission power.

In other implementations, the PA may be replaced with another booster circuit that may not necessarily utilize the principles of adjustable gain amplification. For example, a power supply with different power settings may be utilized to provide the regular and the boosted NFC antenna transmission power FIG. 1 is an example scenario 100 that illustrates NFC coupling arrangement of portable devices to implement dynamic adjustment of transmission power during NFC related functions or transactions. Scenario 100 may include portable devices 102 and a credit card 104 in near field coupling arrangements. For example, the near field coupling arrangements include payment transactions such as EMVco transactions.

As an example of present implementation herein, the example portable devices 102 may include, but are not limited to, Ultrabooks, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like. In this example, the example portable devices 102 may include an NFC antenna (not shown) that is utilized for the NFC related functions or transactions.

As an example of present implementation herein, portable devices 102-2 and/or 102-4 may enter into payment transactions (e.g., EMVco transactions) with the credit card 104. For example, the portable devices 102-2 and/or 102-4 may establish near field coupling with the credit card 104 by positioning the credit card 104 at a certain distance to its respective NFC antenna. At this certain distance, a principle of mutual induction in NFC communications is applied to communicate data between the credit card 104 and the portable devices 102-2 and/or 102-4.

In an implementation, this interchange of data between the portable devices 102 and the credit card 104 may trigger an e-commerce session that requires an increase in NFC antenna transmission power from the portable devices 102-2 and/or 102-4. For example, if the portable devices 102-2 and/or 102-4 are transmitting at a regular NFC antenna transmission power during a typical proximity usage, the increase in NFC antenna transmission power is initiated upon triggering of the e-commerce session. The e-commerce session, for example, includes detection of EMVco transaction).

In another implementation, the trigger to go into the e-commerce session can be initiated by a user through a payment software application running on the portable device 102. For example, the payment software application is configured to trigger the e-commerce session upon its activation by the user.

In an implementation, the same principle as discussed above may be applied when a portable device 102-6 is communicating sensitive data to the portable devices 102-2 and/or 102-4. For example, the interchange of sensitive data (e.g., credit card account number) may trigger the e-commerce session.

As an example of present implementation herein, a booster such as a PA (not shown) may be integrated within circuitry (not shown) of the portable devices 102 in order to obtain the required NFC antenna transmission power during the payment transactions. In this example, the PA may include a configurable amplifier gain or a fixed (set) amplifier gain. For the configurable amplifier gain PA, a controller switch (not shown) may not be implemented since a direct interface may be implemented from a CPU/SOC (not shown) to the configurable amplifier gain PA. For the fixed amplifier gain PA, a switch may be used to connect or disconnect the NFC module to the fixed amplifier gain PA during the payment transactions (e.g., EMVco transactions) or proximity usage, respectively.

Figure 2:
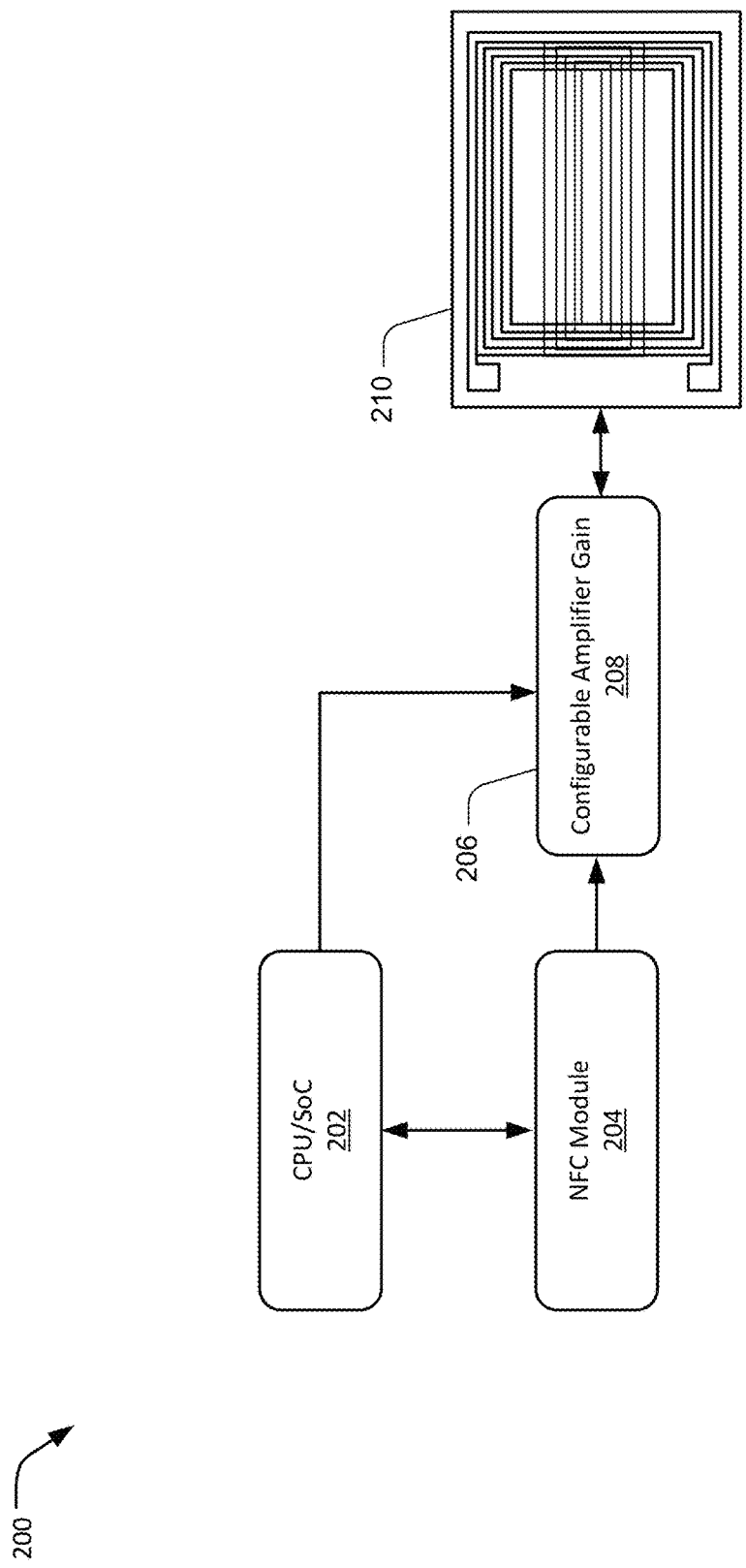
FIG. 2 is an example system of a portable device to implement dynamic adjustment of near field communications (NFC) antenna transmission power during near field coupling transactions.

FIG. 2 illustrates an example system 200 that is configured to implement dynamic adjustment of NFC antenna transmission power during near field coupling transactions. As shown, the system 200 includes a CPU/SoC 202, an NFC module 204, a power amplifier (PA) 206 with configurable amplifier gain 208, and an NFC antenna 210.

As an example of present implementation herein, the CPU/SOC 202 may include one or more processors that are configured to implement a scalable coherent interface (SCI) protocol for an SCI interface in the system 200. In this example, the SCI interface supports distributed multiprocessing with high bandwidth and scalable architecture that allows building of the system 200 out of different components from the portable device 102. For example, the SCI provides interconnection between the CPU/SOC 202, the NFC module 204, and the PA 206 that may be external to the NFC module 204.

In an implementation, an operating system such as Windows™ 8 operating system usage scenario may require the NFC antenna 210 to be in "proximity" mode. The "proximity" mode may be a default mode that consumes relatively low power to support proximity usages. In this implementation, the CPU/SOC 202 may run the payment software application to increase NFC antenna transmission power. For example, the CPU/SOC 202 is configured to initiate triggering of an e-commerce session (e.g., EMVco transactions) such as when the user initializes the payment software application. In this example, the CPU/SOC 202 is configured to switch from the "proximity" mode into "e-commerce session" mode (or e-commerce mode), which requires higher NFC antenna transmission power. In another example, the CPU/SOC 202 may be configured to detect triggering of the e-commerce session (e.g., EMVco transactions) such as when the credit card 104 is positioned within a relative distance from the NFC antenna 210. In this case, initial identification data that is communicated through the mutual induction between the credit card 104 and the NFC antenna 210 may provide a triggering signal for the e-commerce session. To this end, the CPU/SOC 202 is configured to switch from the "proximity" mode into e-commerce mode, which requires higher NFC antenna transmission power.

As an example of present implementation herein, the CPU/SOC 202 may be directly interfaced with the PA 206 in order to control the amount of amplifier gain in the configurable amplifier gain 208. For example, during the "proximity" mode, the amplifier gain of the configurable amplifier gain 208 is maintained at a relative low or regular value; however, during the e-commerce mode, the amplifier gain may be configured by the CPU/SOC 202 to increase in value. In this example, the enabling or activation of the e-commerce mode may be for a limited duration or it may end upon completion of the EMVco transactions or a time out is reached.

As an example of present implementation herein, the NFC module 204 may include a transceiver circuitry that processes electrical signals (not shown) that may be received through the NFC antenna 210. For example, the NFC module 204 may be used to provide tuning to the coil antenna 210 for maximum power transfer during transmit or receive operations. In an implementation, the NFC module 204 may be integrated with the NFC antenna 210 and/or the PA 206 to form a single module As an example of present implementation herein, the NFC module 204 may be configured to control amplifier gain of the configurable amplifier gain 208 since the detection of the "e-commerce session" triggering signal may similarly be implemented at the NFC module 204. Similar to the discussion on the configuration of the CPU/SOC 202 above, the NFC module 204 may be configured to maintain the relatively low amplifier gain during the "proximity" mode. However, during the detection of near field coupling that requires increase in NFC antenna transmission power, the NFC module 204 may be configured to increase the amplifier gain of the configurable amplifier gain 208.

As an example of current implementation herein, the PA 206 may be a linear or non-linear power amplifier positioned in between the CPU/SOC 202 or NFC module 204 and the NFC antenna 210. Furthermore, the PA 206 may be an external PA or an internal PA. For example, the external PA 206 may be an existing PA in the portable device 102 circuitry such as, a tuner amplifier (not shown) in a radio component of the portable device 102. In this example, the tuner amplifier is controlled by the CPU/SOC 202 or the NFC module 204. On the other hand, the internal PA 206 may include a PA that is directly integrated or manufactured with the NFC module 204. For example, the internal PA 206 is manufactured for the purpose of generating higher NFC antenna transmission power during the e-commerce mode.

In other implementations, the PA 206 may be replaced with another booster circuit (not shown) that may not necessarily utilize the same gain control principles. For example, an amplifier with adjustable power supply (not shown) with different power settings may be utilized to provide the regular and the increased NFC antenna transmission power.

As an example of current implementation herein, the NFC antenna 210 may include a continuous loop of coil antenna that may be made out of a printed circuit board (PCB), a flexible printed circuit (FPC), a metal wire, or created through a laser direct structuring (LDS) process. In this example, the NFC antenna 210 may be configured to operate on a resonant frequency (e.g., 13.56 MHz to implement NFC and/or WPT operations), and independent from another transceiver antenna that uses another frequency for wireless communications (e.g., 5 GHz for Wi-Fi signals). In an implementation, the NFC antenna 210 reads the identification data from the credit card 104 that is placed in closed proximity with the NFC antenna 210. In this implementation, the identification data may be communicated to the NFC module 204 or to the CPU/SOC 202 to initiate the "e-commerce session" mode. In another implementation the triggering to initiate the "e-commerce session" may be from user input in a SW application and communicated to CPU/SoC.

Figure 3:
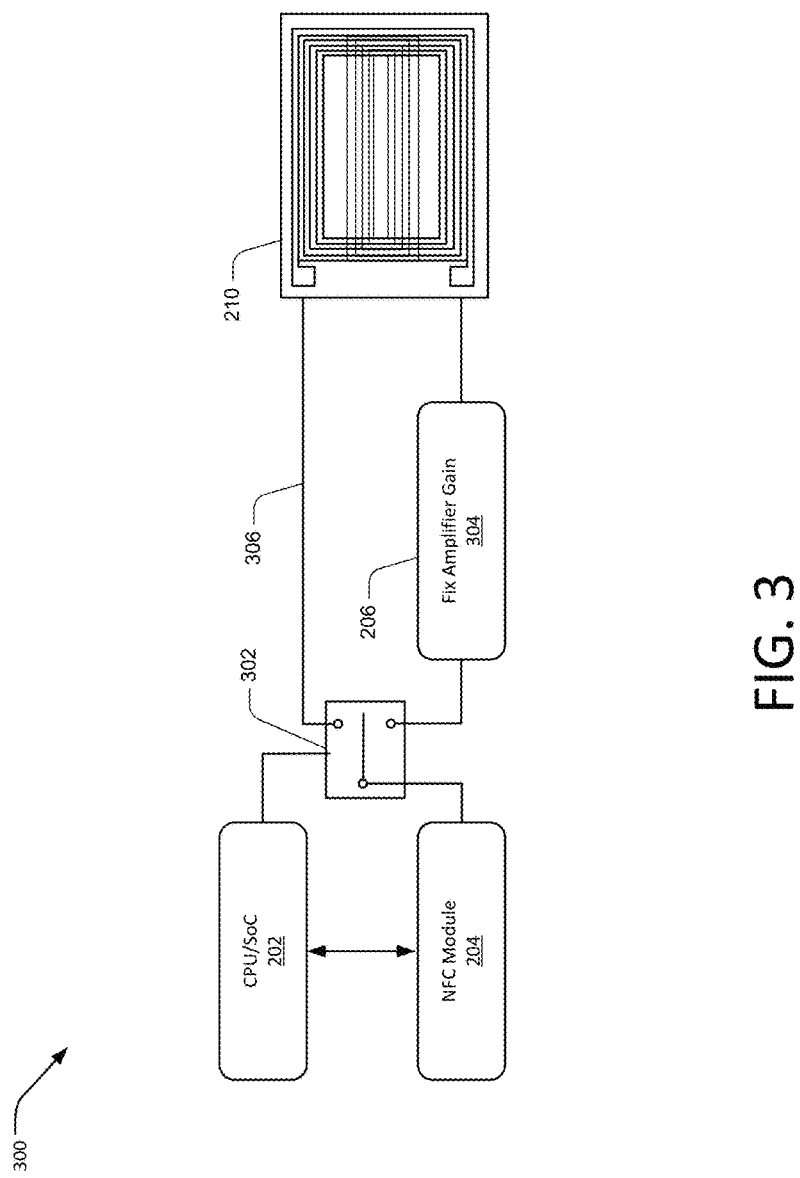
FIG. 3 is an example system of a portable device to implement dynamic adjustment of near field communications (NFC) antenna transmission power during near field coupling transactions.

FIG. 3 illustrates an example system 300 that is configured to implement dynamic adjustment of NFC antenna transmission power during the near field coupling transactions. As shown, the system 300 includes the CPU/SOC 202, NFC module 204, a controller switch 302, PA 206 with fix amplifier gain 304, and the NFC antenna 210.

As an example of current implementation herein, the controller switch 302 is configured to connect the NFC module 204 to the NFC antenna 210 through a link 306 during "proximity" mode. In this example, the transmission power in the NFC antenna 210 utilizes a default/regular transmission power for proximity usage or any other NFC related functions that do not require higher transmission power.

Upon system trigger or detection of the near field coupling that requires boosting of NFC antenna transmission power, the controller switch 302 may be configured by the CPU/SoC 202 to connect the NFC module 204 to the PA 206 (e.g., during the e-commerce mode). In an implementation, the PA 206 includes the fix amplifier gain 304 to amplify the transmission power during the e-commerce mode. In this implementation, the amplifier gain of the fix amplifier gain 304 is neither variable nor controlled by the CPU/SOC 202 or the NFC module 204 during the e-commerce mode. Instead, the amplifier gain of the fix gain amplifier 304 is configured to be constant and sufficient enough to facilitate boosting of the NFC antenna transmission power. In other words, the function of the switch 302 is either to facilitate the regular NFC antenna transmission power, or the amplified/boosted NFC antenna transmission power.

As an example of present implementation herein, the CPU/SOC 202 or the NFC module 204 is configured to control switching operations of the switch 302. In this example, the control may depend upon the mode (i.e., proximity or e-commerce mode) of the portable device 102. Furthermore, the CPU/SOC 202 or the NFC module 204 may be configured with a time threshold that determines the duration of time that the controller switch 302 is switched to increase transmission power by the NFC antenna 210. For example, the time threshold may lapse after completion of the EMVco transaction between the portable device 102 and the credit card 104. In this example, the operation of the system 300 reverts back to the regular transmission of power after expiration of the time threshold.

In another implementation, the CPU/SOC 202 or the NFC module 204 may be configured to directly control amount of input current or voltage (not shown) to the link 306. In this implementation, the PA 206 and the switch 302 are not required in the circuitry of the system 300. Instead, the regular transmission power and the boosted transmission power are determined by the amount of input current or input voltage that is supplied directly by the CPU/SOC 202 or the NFC module 204 to the NFC antenna 210.

One NFC antenna may be used for both transmit (Tx) and receive (Rx). However for the NFC solutions that are able to support separate Tx and Rx antennas, the booster operation can be more robust with strategic placement of the two antennas/coils.

Figure 4:
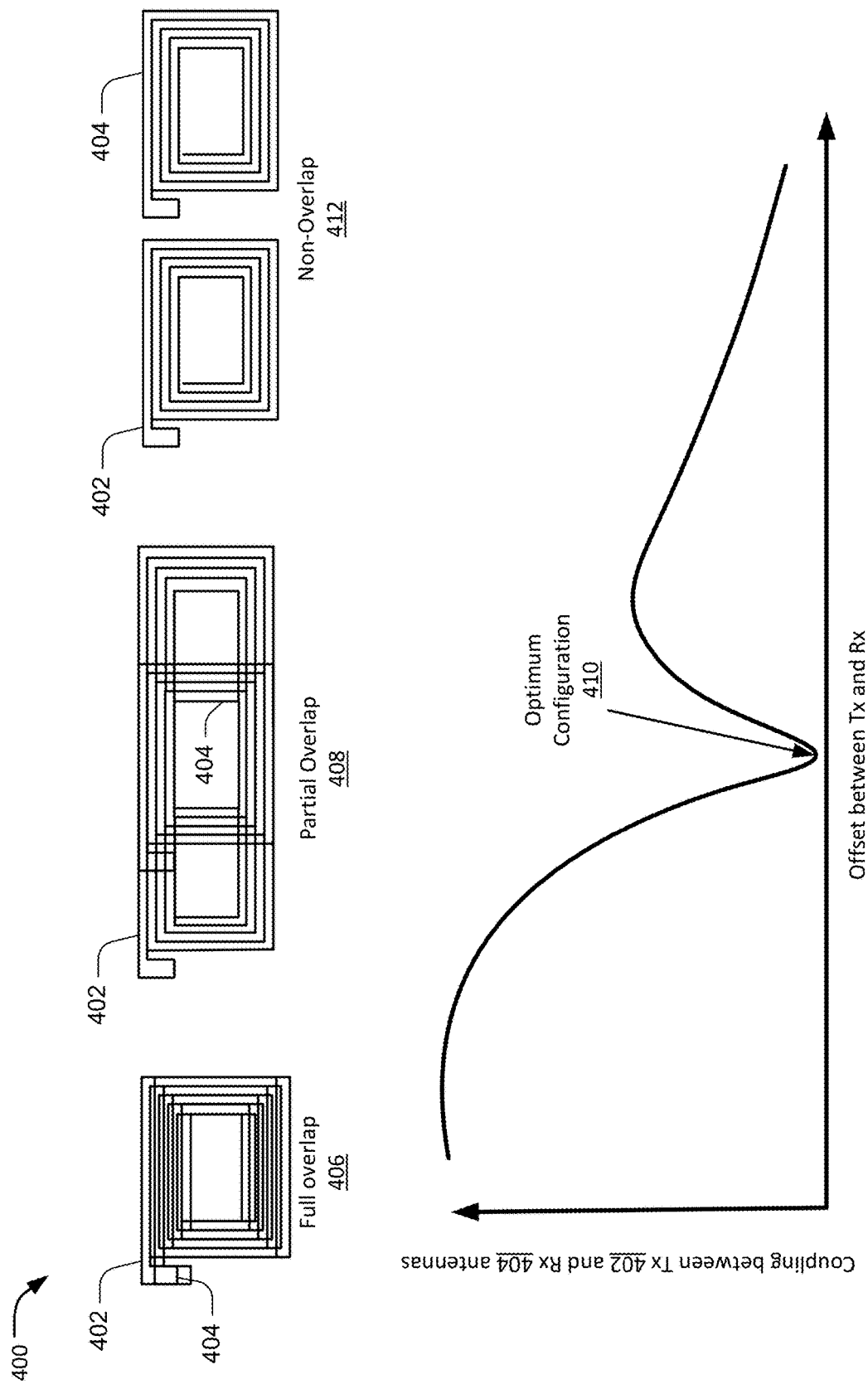
FIG. 4 is a diagram of an example coupling coefficient change for different overlapping configurations between a near field communications (NFC) transmitting (Tx) antenna and a separate NFC Receiving (Rx) antenna.

FIG. 4 illustrates a scenario 400 that shows different overlap configurations between an NFC transmit (Tx) antenna 402 and a separate NFC Receive (Rx) antenna 404. For example, the overlap configurations include a full overlap 406, a partial overlap 408 that generates optimum configuration 410, and a non-overlap 412.

As an example of present implementation herein, different overlap configurations provide different coupling coefficients that may indicate an amount of mutual induction interaction between the two antennas. For example, the full overlap 406 may provide a high coupling coefficient due to in-phase magnetic fluxes (not shown) that may be generated by magnetic fields of the Tx antenna 402 to the Rx antenna 404. In this example, amplifying the transmission power at the Tx antenna 402 may saturate the Rx antenna 404.

As an example of present implementation herein, the partial overlap 408 provides a minimum coupling coefficient due to out-of-phase magnetic fluxes (not shown) that may be generated by magnetic fields of the Tx antenna 402 to the Rx antenna 404. In this example, the magnetic fluxes generated by the Tx antenna 402 penetrates the Rx antenna 404 with about the same amount in opposite direction to yield a minimum coupling coefficient such as an optimum configuration 410. In other words, amplifying the transmission power at the Tx antenna 402 is more robust since the amplification is not "visible" to Rx antenna 404 chain.

As an example of present implementation herein, the non-overlap 412 provides a relatively higher coupling coefficient as compared to the partial overlap 408. This is due to co-existence of the partial out-of-phase magnetic fluxes and the in-phase magnetic fluxes between the two antennas.

Figure 5:
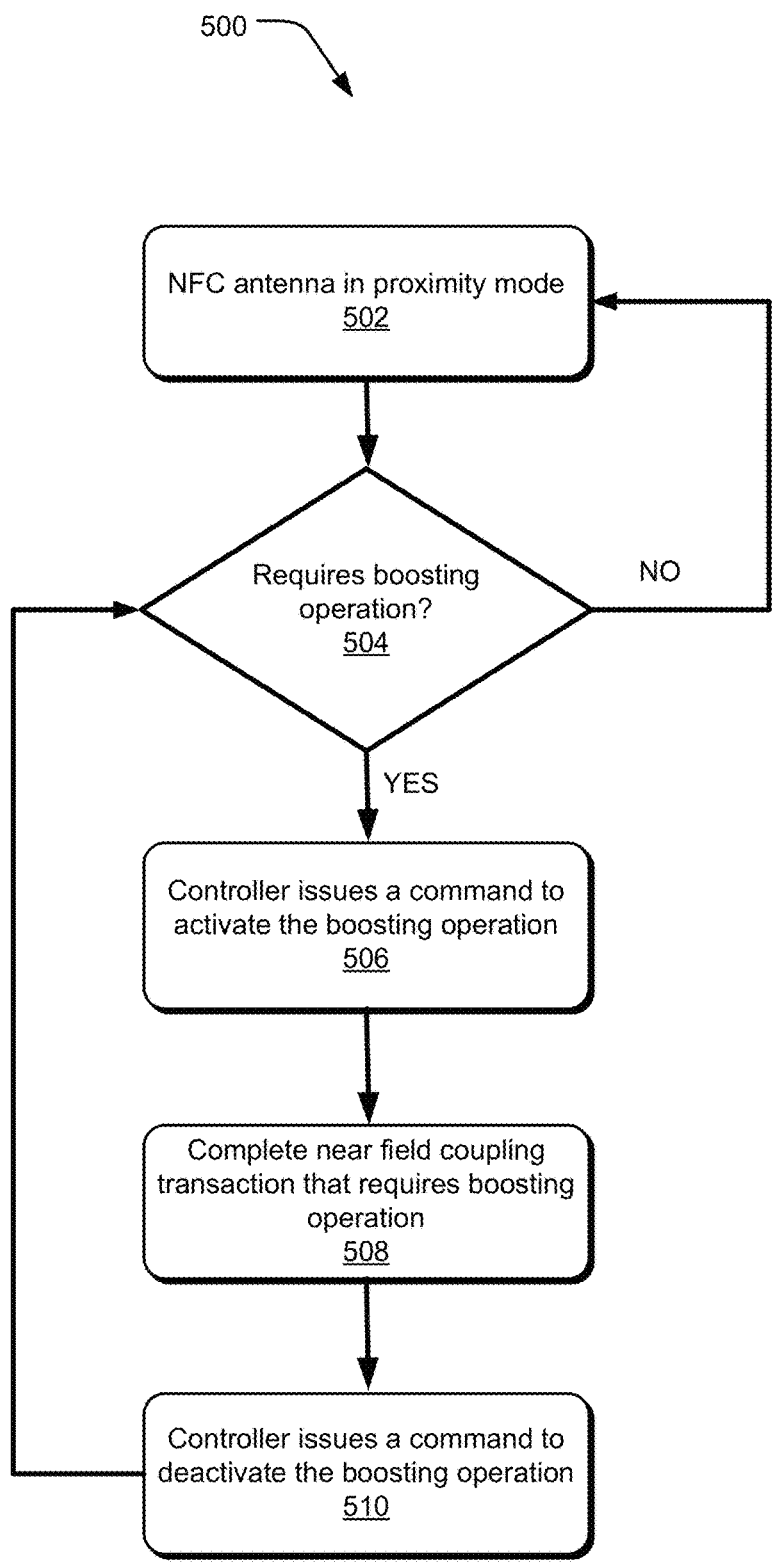
FIG. 5 is an example process chart illustrating an example method for dynamic adjustment of near field communications (NFC) antenna transmission power during near field coupling transactions.

FIG. 5 shows an example process chart 500 illustrating an example method for dynamic adjustment of NFC antenna transmission power during NFC related functions that may require increased NFC antenna transmission power. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, an NFC antenna is configured to be in "proximity" mode as its default mode. For example, in an operating system such as Windows™ 8 operating system usage scenario, the NFC sub system (e.g., NFC antenna 210 and NFC module 204) is configured to be in the "proximity" mode, which consumes relatively low power, and supports proximity usages. In this example, the NFC antenna 210 is transmitting a regular NFC antenna transmission power. In an implementation, the "proximity mode" may include other near field coupling transactions that do not require increase in NFC antenna transmission power.

At block 504, detecting if a boosting operation is required is performed. In an implementation, a CPU/SOC (e.g., CPU/SOC 202) detects a triggering signal from user (i.e. through a software application) to boost the transmit power. In another implementation an NFC module (e.g., NFC module 204) is configured to detect if a near field coupling transaction requires increasing of NFC antenna transmission power. For example, if the near field coupling transaction do not require increasing of the NFC antenna transmission power, then following the "NO" branch of block 502, the "proximity" mode is maintained as the default mode.

On the other hand, if the near field coupling transaction requires increasing of the NFC antenna transmission power, then following "YES" branch at block 506, the CPU/SOC 202 issues a command to activate boosting operation (i.e., activating PA 206). For example, user may use a payment software application on the system that "triggers" the e-commerce session. In this example, the CPU/SoC 202 is configured to switch the NFC sub system from the "proximity" mode into e-commerce mode, which requires increasing of the default regular NFC antenna transmission power. In another example, when a credit card (e.g., credit card 104) is positioned within a relative distance from the NFC antenna 210, initial identification data that is communicated through the mutual induction between the credit card 104 and the NFC module 204 may provide a triggering signal for an e-commerce session. In this example, the CPU/SOC 202 or the NFC module 204 configures the switch from the "proximity" mode into e-commerce mode, which requires increasing of the default regular NFC antenna transmission power. In an implementation, the e-commerce mode may include all other transactions that require increase in the NFC antenna transmission power.

At block 508, completing the near field coupling transaction that requires boosting operation is performed. For example, the activating and utilizing of the PA 206 may last until the e-commerce mode (e.g., EMVco transaction) is completed. In another implementation, a time threshold is configured to control the duration of time when the PA 206 is activated. For example, the time threshold of sixty seconds after the detection of the e-commerce session will allow the PA 206 to increase the NFC antenna transmission power for sixty seconds before it reverts back to its default regular NFC antenna transmission power.

At block 510, the controller issues a command to deactivate the boosting operation. In an implementation, the CPU/SOC 202 or the NFC module 204 may issue the command to stop the PA 206 in facilitating the increase of NFC antenna transmission power.

Figure 6:
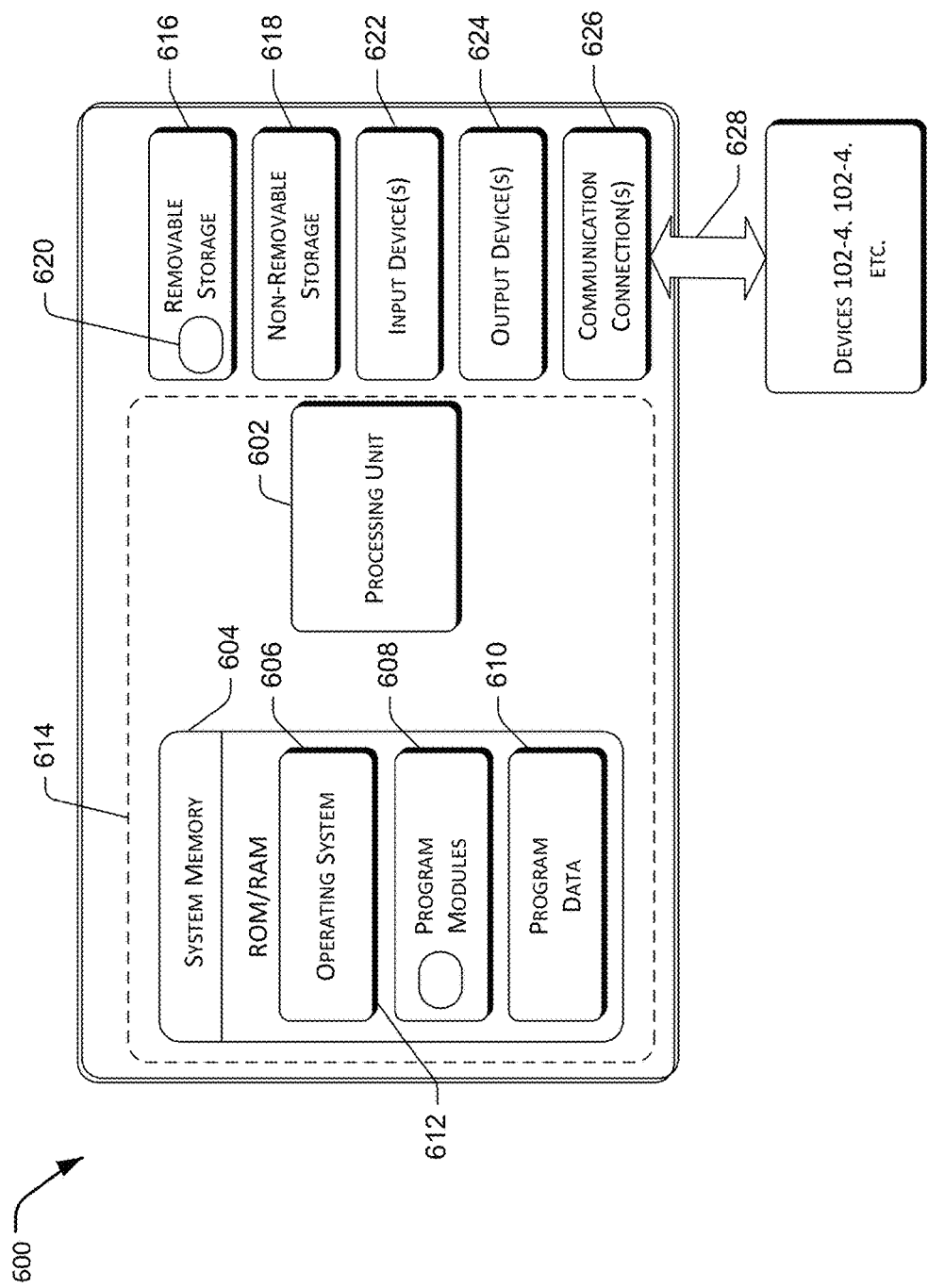
FIG. 6 is a diagram example system for dynamic adjustment near field communications (NFC) antenna transmission power.

FIG. 6 is an example system that may be utilized to implement various described embodiments. However, it will be readily appreciated that the techniques disclosed herein may be implemented in other computing devices, systems, and environments. The computing device 600 shown in FIG. 6 is one example of a computing device and is not intended to suggest any limitation as to the scope of use or functionality of the computer and network architectures.

In at least one implementation, computing device 600 typically includes at least one processing unit 602 and system memory 604. Depending on the exact configuration and type of computing device, system memory 604 may be volatile (such as RAM), non-volatile (such as ROM, flash memory, etc.) or some combination thereof. System memory 604 may include an operating system 606, one or more program modules 608 that implement the long delay echo algorithm, and may include program data 610. A basic implementation of the computing device 600 is demarcated by a dashed line 614.

The program module 608 may include a module 612 configured to implement the one-tap connection and synchronization scheme as described above. For example, the module 612 may carry out one or more of the method 600, and variations thereof, e.g., the computing device 600 acting as described above with respect to the device 102.

Computing device 600 may have additional features or functionality. For example, computing device 600 may also include additional data storage devices such as removable storage 616 and non-removable storage 618. In certain implementations, the removable storage 616 and non-removable storage 618 are an example of computer accessible media for storing instructions that are executable by the processing unit 602 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 600 and wireless mobile device 102. Any of such computer accessible media may be part of the computing device 600.

In one implementation, the removable storage 616, which is a computer accessible medium, has a set of instructions 630 stored thereon. When executed by the processing unit 602, the set of instructions 630 cause the processing unit 602 to execute operations, tasks, functions and/or methods as described above, including method 600 and any variations thereof.

Computing device 600 may also include one or more input devices 620 such as keyboard, mouse, pen, voice input device, touch input device, etc. Computing device 600 may additionally include one or more output devices 622 such as a display, speakers, printer, etc.

Computing device 600 may also include one or more communication connections 624 that allow the computing device 600 to communicate wirelessly with one or more other wireless devices, over wireless connection 628 based on near field communication (NFC), Wi-Fi, Bluetooth, radio frequency (RF), infrared, or a combination thereof.

It is appreciated that the illustrated computing device 600 is one example of a suitable device and is not intended to suggest any limitation as to the scope of use or functionality of the various embodiments described.

Unless the context indicates otherwise, the term "Universal Resource Identifier" as used herein includes any identifier, including a GUID, serial number, or the like.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques", for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more", unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

The term "computer-readable media" includes computer-storage media. In one embodiment, computer-readable media is non-transitory. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

What is claimed is:

1. A device comprising:
one or more processors;
a near field communication (NFC) module coupled to the one or more processors and configured to read a data identification that requires a higher transmission power, wherein the NFC module is configured to supply and control an amount of transmission current or voltage in response to the reading of the data identification;
an NFC antenna coupled to the NFC module, wherein the NFC antenna includes a dynamic transmission power based upon received amount of transmission current or voltage from the NFC module.

2. The device as recited in claim 1 further comprising a boosting circuit coupled to the NFC module, wherein the boosting circuit includes a power amplifier (PA) with a configurable amplifier gain, wherein the configurable amplifier gain is dynamically adjusted to generate increased NFC antenna transmission power.

3. The device as recited in claim 1, wherein the data identification is derived from an "e-commerce" card near field coupling transaction that requires increased NFC antenna transmission power.

4. The device as recited in claim 2, wherein the boosting circuit is an external power amplifier (PA).

5. The device as recited in claim 2, wherein the boosting circuit is an internal power amplifier (PA) integrated with the NFC module to form a single module.

6. The device as recited in claim 1, wherein the NFC module is configured to increase the supply or amount of transmission current or voltage until completion of a near field coupling transaction that requires increased NFC antenna transmission power.

7. The device as recited in claim 6, wherein the NFC module is configured to increase the NFC antenna transmission power within a time threshold that includes a duration of time that the NFC antenna transmission power is increased.

8. The device as recited in claim 1, wherein the NFC module is configured to maintain a relatively low power during a proximity mode.

* * * * *